Figure 1:
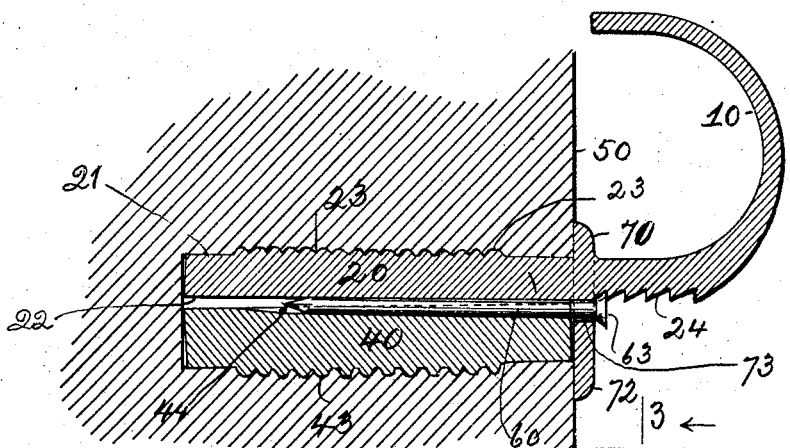

No. 780,957. PATENTED JAN. 24, 1905.
F. C. PALMER.
WALL HOOK.
APPLICATION FILED JAN. 20, 1904.

2 SHEETS—SHEET 1.

Witnesses
Herman Meyer

Frederick C. Palmer  Inventor
By His Attorney William R. Baird

No. 780,957. PATENTED JAN. 24, 1905.
F. C. PALMER.
WALL HOOK.
APPLICATION FILED JAN. 20, 1904.

2 SHEETS—SHEET 2.

Witnesses
E. J. Cox.
Herman Meyer

Frederick C. Palmer  Inventor
By His Attorney William R. Baird

No. 780,957.

Patented January 24, 1905.

UNITED STATES PATENT OFFICE.

FREDERICK C. PALMER, OF BROOKLYN, NEW YORK.

WALL-HOOK.

SPECIFICATION forming part of Letters Patent No. 780,957, dated January 24, 1905.

Application filed January 20, 1904. Serial No. 189,853.

*To all whom it may concern:*

Be it known that I, FREDERICK C. PALMER, a citizen of the United States, and a resident of Brooklyn, in the county of Kings and State of New York, have invented certain new and useful Improvements in Wall-Hooks, of which the following is a specification.

My invention relates to wall-hooks and the methods and means for retaining them in place.

By a "wall-hook" I mean an article comprising a hook portion designed to support another article engaged therein or upheld thereby and a suitable shank portion, means being provided to retain the same against the wall or similar surface to which it is secured.

So far as my knowledge of the art extends the means usually employed for securing wall-hooks to walls at present comprise a wooden plug driven into an aperture in the wall and into which in turn the shank of the wall-hook is driven. A plug of this character if wet rots and if dry shrinks, and thus rapidly deteriorates with age, and even when some other material is employed to fill the hole these hooks frequently work loose and drop their load. In an effort to overcome these disadvantages a wall-hook and securing means have been devised which, briefly, consist of a wall-hook provided with a hook portion and a shank and a plug which, with the shank, is almost sufficient to fill an aperture in a wall in which the shank is inserted, means for forcing the shank and plug apart, such as a nail or screw, and means comprising indentations in the lower side of the shank for preventing the displacement of the nail or screw.

The subject-matter of my present application is an improvement upon the device briefly described, in the practical use of which device I have found that a strong upward or downward pull upon the hook might possibly tend to loosen the nail or screw by pulling its head away from the indentations in the lower side of the shank. To remedy this, I have invented an attachment to the hook which will effectually prevent rotation of the hook about a transverse horizontal axis comprising a shield and adapted to press closely against the wall around the aperture into which the shank of the hook is inserted.

Figure 2:
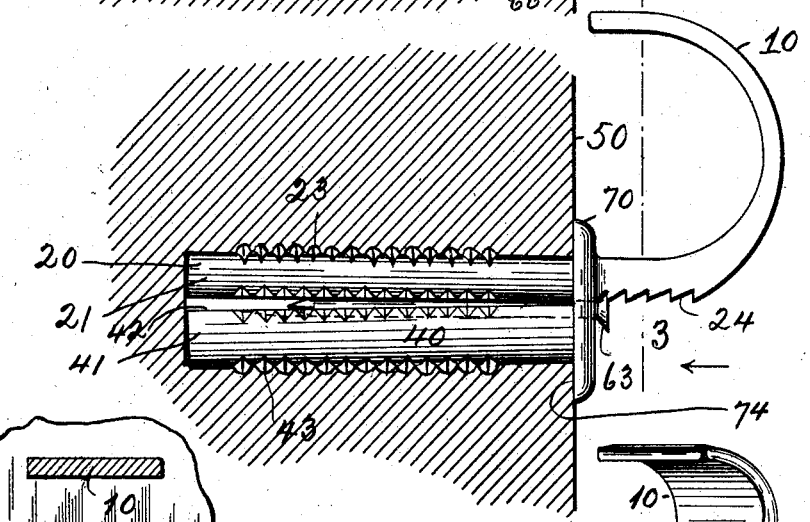
Figure 3:
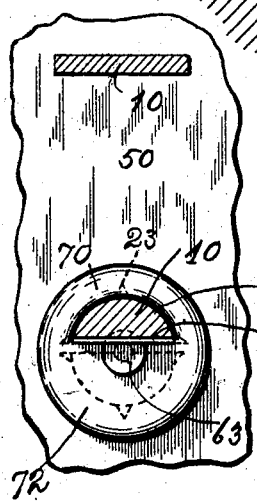
Figure 4:
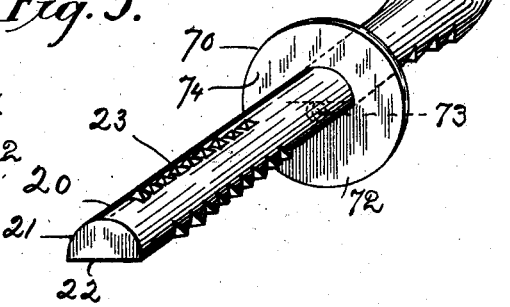
Figure 5:
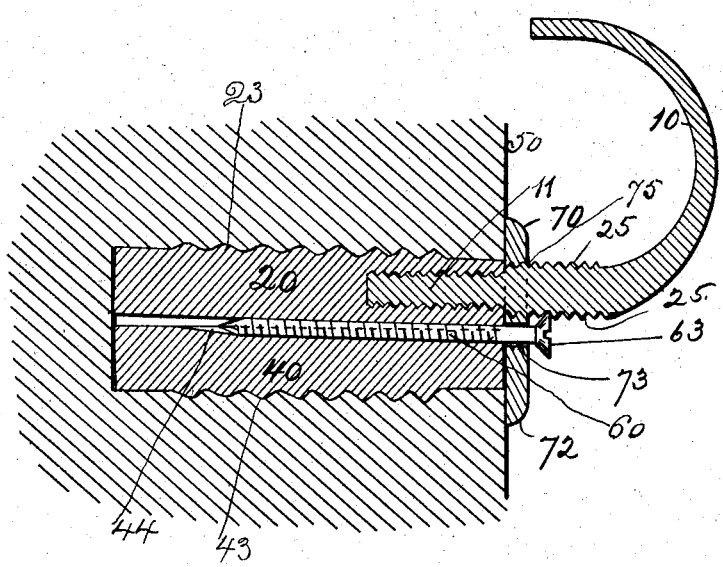
Figure 6:
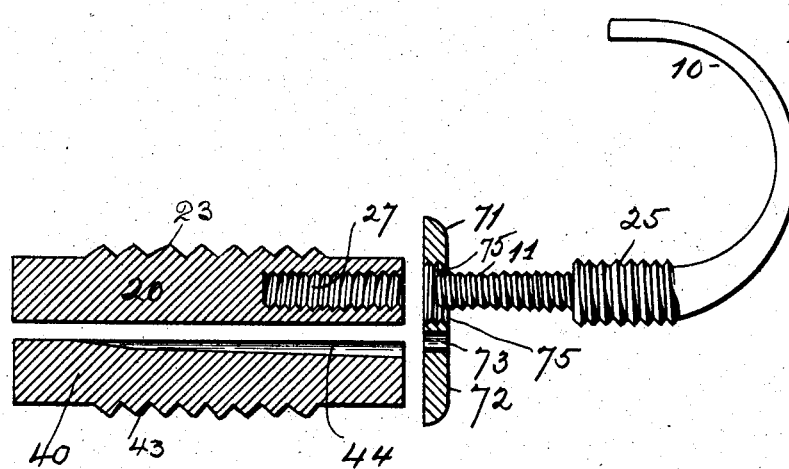

In the drawings, Figure 1 is a vertical section of a wall and wall-hook placed therein. Fig. 2 is a side elevation of the same parts, the wall alone being shown in section. Fig. 3 is an end elevation and partial vertical section on the plane of the line 3 3 in Fig. 2. Fig. 4 is a perspective view of the hook and shank portions and shield, the form of the external projections being slightly modified. Fig. 5 is a vertical section of a modified form of the device assembled; and Fig. 6 is a side elevation and partial vertical section of the parts before assembling, the nail being omitted.

In the drawings, 10 is the hook portion of the wall-hook, made of any suitable size and material; 20, the shank, having a rounded portion 21 and a flat portion 22 and with external projections 23 and indentations 24, and 50 is the wall in which it is to be secured by fastening it within the aperture therein. The form of the external projections 23 may vary somewhat, as shown in Figs. 1 and 4.

40 is a plug having a rounded portion 41, a flat portion 42, provided with a groove 44, and projections 43 on the rounded portion.

60 is a nail, screw, or similar article adapted to fit into the groove 44 and provided with a conical or projecting head 63, engaging with the indentations 24 of the hook 10.

So far as above described, this device is identical with that before referred to; but I provide in this case a shield 70, which has a portion 71 projecting upward from the shank 20 and another portion, 72, projecting downwardly therefrom and is apertured at 73 to admit of the passage of the nail or screw 60. I prefer that this shield 70 shall have a flat surface 74 on its inner side, so as to fit snugly against the wall. I also prefer that the shield shall be made integral with the shank, as illustrated in Figs. 1, 2, 3, and 4. I have, however, found useful a modified form of the device, which is illustrated in Figs. 5 and 6. In this modification the shank 20 is made separable from the hook proper, an intermediate threaded portion 25 being provided on the latter, and a threaded projection 11 therefrom enters a threaded aperture 27 in the shank. The shield 70 also is separable from the hook, being provided with a threaded aperture 75 to fit the intermediate threaded portion 25, and thereby be adjustable thereon. The threads of the portion 25 serve the same function as the indentations 24, (shown in Figs. 1, 2, and 4,) being engaged by the head 63 of the nail 60.

What I claim is—

1. A wall-hook or the like comprising an apertured shield, a shank, a plug adapted to partially fill the hole in a wall in which the shank is placed, and means comprising a nail adapted to force apart the plug and the shank and to pass through the aperture in the shield.

2. A wall-hook or the like comprising a threaded portion, a shank, an apertured shield, a plug, and means for pressing apart the plug and shank adapted to pass through the aperture in the shield and provided with a head adapted to engage the threaded portion.

Witness my hand, this 19th day of January, 1904, at the city of New York, in the county and State of New York.

FREDERICK C. PALMER.

Witnesses:
HERMAN MEYER,
S. J. COX.